United States Patent
Chen et al.

(10) Patent No.: US 10,389,518 B2
(45) Date of Patent: Aug. 20, 2019

(54) BLOCKCHAIN HASH VALUE RECOMPUTATION

(71) Applicant: Hewlett Packard Enterprise Development LP, Houston, TX (US)

(72) Inventors: Liqun Chen, Bristol (GB); Stuart Haber, New York, NY (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 204 days.

(21) Appl. No.: 15/418,533

(22) Filed: Jan. 27, 2017

(65) Prior Publication Data
US 2018/0219669 A1    Aug. 2, 2018

(51) Int. Cl.
| | |
|---|---|
| H04L 9/14 | (2006.01) |
| H04L 9/00 | (2006.01) |
| H04L 9/06 | (2006.01) |
| H04L 9/08 | (2006.01) |
| H04L 9/32 | (2006.01) |

(52) U.S. Cl.
CPC ............ *H04L 9/002* (2013.01); *H04L 9/0643* (2013.01); *H04L 9/0891* (2013.01); *H04L 9/3236* (2013.01); *H04L 9/3297* (2013.01); *H04L 2209/12* (2013.01); *H04L 2209/38* (2013.01); *H04L 2209/56* (2013.01)

(58) Field of Classification Search
CPC ............ H04L 2209/38; H04L 2209/56; H04L 9/3236; H04L 9/0643; H04L 9/3239; G06Q 20/065; G06Q 2220/00; G06Q 20/401; G06Q 20/10; G06Q 40/04; G06Q 20/36; G06Q 20/3678; G06F 21/64
See application file for complete search history.

(56) References Cited

U.S. PATENT DOCUMENTS 5,373,561 A * 12/1994 Haber .............. G06Q 20/38215
                                              380/30
8,655,919 B2    2/2014 Cachin et al.
(Continued)

FOREIGN PATENT DOCUMENTS

CN    105450734        3/2016
KR    20170040079 A  *  4/2017   ............. H04L 9/06
(Continued)

OTHER PUBLICATIONS

ESPAcoin team, "zkFUND: Secure Decentralised Generalised One-time Ring Signature Peer-to-Peer Scalable Off-Chain Untraceable Electronic Instant Cash System and MimbleWimble Transaction Ledger Consensus", Jul 17, 2015, obtained online from <https://www.espacoin.com/protocol.pdf>, retrieved on Oct. 11, 2018.*
(Continued)

*Primary Examiner* — Farid Homayounmehr
*Assistant Examiner* — Zhimei Zhu

(57) ABSTRACT

A blockchain includes blocks that each store a hash value computed using a hash function from data of the block. Another hash value is computed for each block using a different hash function, and added to the block within the blockchain. New blocks subsequently added to the blockchain have hash values computed using just the different hash function.

20 Claims, 6 Drawing Sheets

(56) References Cited

U.S. PATENT DOCUMENTS

| | | | |
|---|---|---|---|
| 2016/0027229 A1* | 1/2016 | Spanos | G07C 13/00 705/51 |
| 2016/0028552 A1* | 1/2016 | Spanos | H04L 9/3297 713/178 |
| 2016/0164884 A1* | 6/2016 | Sriram | G06Q 10/06315 705/51 |
| 2016/0191243 A1† | 6/2016 | Manning | |
| 2016/0254910 A1* | 9/2016 | Finlow-Bates | H04L 9/0891 713/158 |
| 2017/0085555 A1* | 3/2017 | Bisikalo | H04L 63/0807 |
| 2017/0134280 A1* | 5/2017 | Davis | G06Q 20/10 |
| 2017/0236120 A1† | 8/2017 | Herlihy et al. | |
| 2017/0338947 A1† | 11/2017 | Ateniese et al. | |
| 2017/0344987 A1* | 11/2017 | Davis | G06F 17/3033 |
| 2017/0352219 A1* | 12/2017 | Spanos | G07C 13/00 |
| 2018/0039785 A1* | 2/2018 | Naqvi | G06Q 30/0635 |
| 2018/0039786 A1* | 2/2018 | Naqvi | G06Q 20/027 |
| 2018/0046766 A1* | 2/2018 | Deonarine | G06F 19/326 |
| 2018/0063189 A1* | 3/2018 | Versteeg | H04L 63/1466 |
| 2018/0084042 A1* | 3/2018 | Finlow-Bates | H04W 12/04 |
| 2018/0102013 A1* | 4/2018 | Spanos | G06F 21/64 |
| 2018/0115413 A1* | 4/2018 | King | G06F 21/64 |
| 2018/0150647 A1* | 5/2018 | Naqvi | G06F 21/6218 |

FOREIGN PATENT DOCUMENTS

| | | |
|---|---|---|
| PH | 2015000069 | 9/2016 |
| WO | 2016131473 | 8/2016 |
| WO | WO-2018026727 A1 * | 8/2018 |

OTHER PUBLICATIONS

Bayer, D. et al., "Improving the efficiency and reliability of digital time-stamping." In R.M. Capocelli, A. De Santis, and U. Vaccaro, editors, Sequences II: Methods in Communcation, Security, and Computer Science, Springer-Verlag, 1993.

Giuseppe Atenicse et al., "Redactable Blockchain or Rewriting History in Bitcoin and Friends," Aug. 5, 2016, pp. 1-36, Available at: <eprint.iacr.org/2016/757.pdf>.

Haojun Zhang et al., "A Novel Self-renewal Hash Chain and Its Implementation," EUC '08 Proceedings of the 2008 IEEE/IFIP International Conference on Embedded and Ubiquitous Computing, Dec. 2008, pp. 144-149, IEEE Computer Society.

Haber, S. "Long-lived digital integrity using short-lived hash functions", presented at NIST's Second Cryptographic Hash Workshop, Santa Barbara, CA, Aug. 2006, online.

X. Wang and H. Yu. "How to break MD} and other hash functions." In R. Cramer, editor, Advances in Cryptology—EUROCRYPT 2005, vol. 3494 of Lecture Notes in Computer Science, Springer-Verlag, 2005.

X. Wang, Y.L. Yin, and H. Yu. "Finding collisions in the full SHA-1." In V. Shoup, editor, Advances in Cryptology—CRYPTO 2005, vol. 3621 of Lecture Notes in Computer Science, Springer-Verlag, 2005.

\* cited by examiner
† cited by third party

BLOCKCHAIN HASH VALUE RECOMPUTATION

BACKGROUND

A blockchain is a distributed database that maintains a continuously growing list of ordered records referred to as blocks. A blockchains can be used as an open, distributed ledger to record transactions among parties efficiently and in a verifiable manner. Each block of a blockchain is linked to a previous block within the blockchain. Blockchains are suitable for the recording of events, records, transaction processing, and proving provenance. Verification of the data contained with blocks is achieved in a distributed consensus manner, in which data integrity is maintained in part by database replication and computational trust.

DETAILED DESCRIPTION

Figure 1:
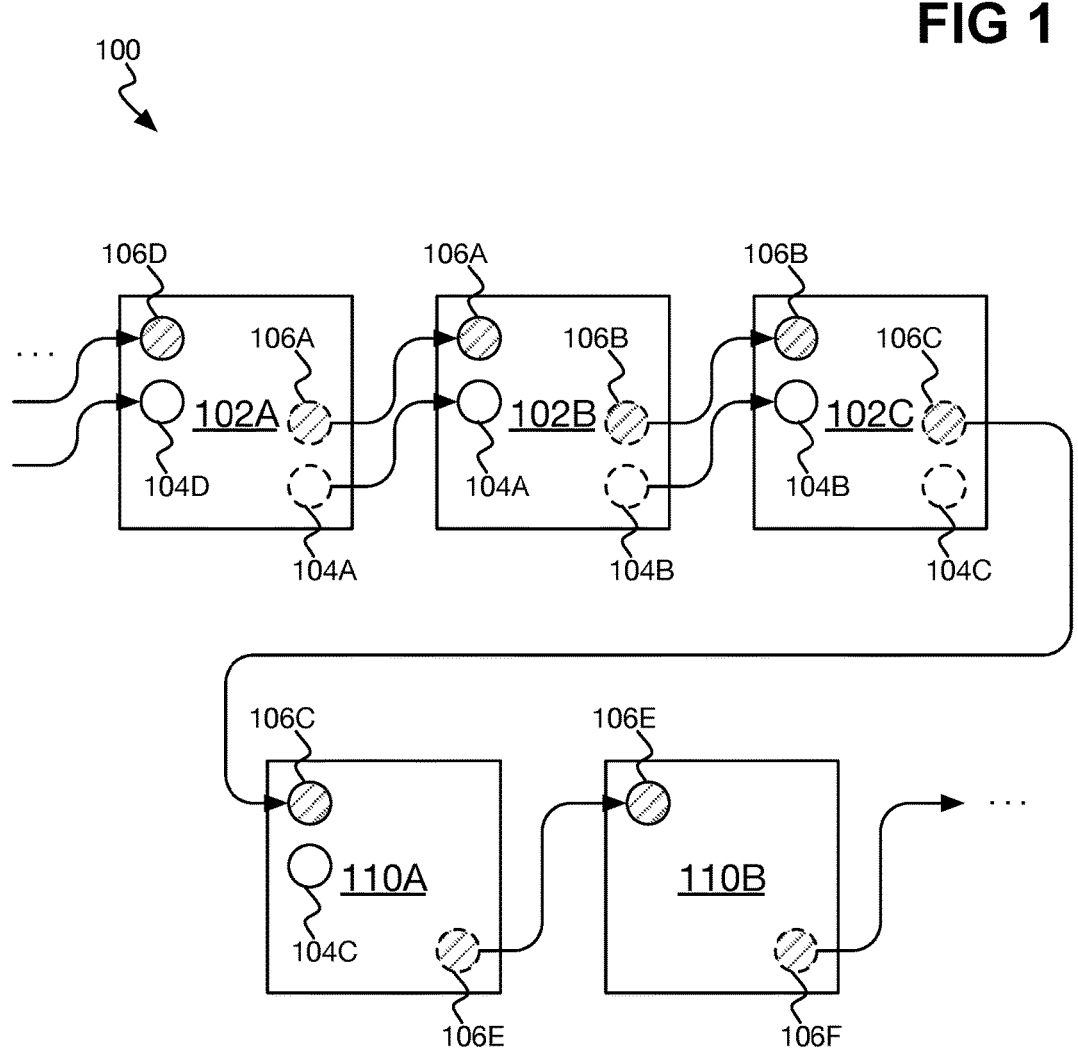
FIG. 1 is a diagram of an example blockchain.

As noted in the background section, blockchains are distributed databases that maintain continuously growing lists of ordered blocks. Blockchains reduce the costs involved in verifying transactions, including by removing the need for trusted third parties to complete transactions. This has permitted blockchains to be employed for the creation of cryptocurrencies, the most common of which is Bitcoin. However, blockchain technology has applicability to other types of data as well.

A hallmark of any blockchain is that once the data has been recorded in a block, it cannot be altered retroactively without detection. To guarantee data integrity in this manner, at least one hash value is computed from the data of each block of a blockchain, and stored at least in the next block of the blockchain. As such, to link a block to another block, the latter block's hash value is copied to the former block.

Therefore, a hash function is selected when a particular blockchain is designed, and used to compute hash values for blocks as the blocks are added to the blockchain. The hash function provides data integrity and security by being a one-way hash function, which means that knowledge of both a hash value and the hash function does not permit computation of the data from which the hash value was computed. Stated another way, given a hash value, it is at least computationally infeasible to determine the data that was input to the one-way hash function to generate the given hash value.

As such, the hash function employed for a given blockchain can be critical to the integrity of the data stored within the blockchain. A number of well-known hash functions are often selected for use with blockchains, due to their having undergone significant mathematical scrutiny by experts to confirm that the hash functions are truly one-way. Examples of such hash functions include the SHA-256, RIPEMD-256, and SHA3-256 hash functions. The popularity of such hash functions, and their certification by various governmental and other organizations, has led to their widespread usage within blockchains, under the belief that the hash functions are cryptographically secure.

However, even hash functions that have widespread adoption and are understood to be cryptographically secure may still be subject to future, as yet unknown cryptographic vulnerabilities. Even the knowledge that hash functions that were once widely used and widely thought to be secure have been compromised, such as the MD5 hash function, has not caused blockchain architectures to develop approaches to counteract this single point of potential failure. The hash function used to compute hash values for blocks of a blockchain is indeed a single point of failure, because if the hash function becomes cryptographically vulnerable, the data integrity of every block of the blockchain becomes suspect, to potentially disastrous consequences.

New hash functions are periodically proposed and subjected to mathematical scrutiny, resulting in hash functions being developed that are more cryptographically secure than existing hash functions. New blockchains can thus be instantiated that employ better hash functions than existing blockchains. However, this is of little consolation and assistance to existing blockchains: once a hash function has been selected for usage within a blockchain, a new hash function cannot be substituted for the originally selected hash function.

Techniques disclosed herein, though, permit an existing blockchain, having blocks with hash values computed using a given hash function, to be supplemented with a different hash function that is arguably better than the given hash function. For instance, if a new hash function is developed that has been proven to be more cryptographically secure than a hash function that an existing blockchain is using, new hash values computed using the new hash function can be added to the existing blockchain. This means that as new, more cryptographically secure hash functions are developed, existing blockchains can be updated to employ such hash functions, improving the integrity of the data stored within the blockchains.

FIG. 1 shows an example blockchain 100. Prior to supplementation via a new hash function, the blockchain 100 includes blocks 102A, 102B, and 102C, collectively referred to as the blocks 102, and where the singular phrase "block 102" refers to one of the blocks 102. The block 102C is the last block of the blockchain 100 prior to supplementation of the blockchain 100 with a new hash function. However, there are blocks before the block 102A; that is, the first block of the blockchain 100 is not depicted in FIG. 1.

Prior to supplementation with a new hash function, each block 102 stores a hash value 104 of the block 102 to which it is chained, which is computed via an original hash function using the latter block 102's data. Each block 102 can also store a hash value 104 computed via the original hash function from the data of the block 102 itself. The term "original" is used herein in relation to this hash function to convey that hash values were computed by this hash function prior to any hash values being computed using a new hash function and subsequently stored. That a block 102 stores a hash value 104 computed from data of a linked-to block 102 is depicted in FIG. 1 as a solid-line empty circle, and that a block 102 can store a hash value 104 computed from data of the block 102 itself is depicted in FIG. 1 as a dashed-lined empty circle.

In FIG. 1, therefore, the block 102A can store a hash value 104A computed from data of the block 102A using the original hash function, and the block 102B is linked to the block 102A by storing the hash value 104A. The block 102A stores a hash value 104D computed via the original hash function from data of a block to which the block 102A links. The block 102б can store a hash value 104б computed from the data of the block 102б using the original hash function, and the block 102C is linked to the block 102B by storing the hash value 104B. The block 102C can store a hash value 104C computed from data of the block 102C using the original hash function.

That the hash value 104 of a block 102 is computed from the data of the block 102 can mean that the hash value 104 is computed using the original hash function from a block header of the block 102. The block header of a block 102 in the blockchain 100 can include the following information: version information, the hash value of the linked-to block 102, a hash tree root, a timestamp, a difficulty target, and a nonce. The version information can specify a version number of the blockchain 100. The hash value of the linked-to block 102 is as has been described; for instance, the hash value 104A of the block 102A appears in the block header of the block 102б. The hash tree root is a hash value of the root node of the hash tree in which data, or transactions, of the block 102 is encoded, as is subsequently described in the detailed description. The timestamp specifies the time at which the block 102 was created, whereas the difficulty target and the nonce are metadata used in conjunction with the proof-of-work function or algorithm specifying the level of work that has to be performed for participants in the blockchain 100 to accept the block.

After supplementation with a new hash function, each block 102 also stores a hash value 106 of the block 102 to which it is chained, which is computed via the new hash function using the data of the latter block 102. Each block 102 can also store a hash value 106 computed via the new hash function from data of the block 102 itself. That a block 102 stores a hash value 106 computed from the data of a linked-to block 102 is depicted in FIG. 1 as a solid-line shaded circle, and that a block 102 can store a hash value 106 computed from the data of the block 102 itself is depicted in FIG. 1 as a dashed-lined shaded circle.

In FIG. 1, the block 102A can store a hash value 106A computed from data of the block 102A using the new hash function, and the block 102б is linked to the block 102A by storing the hash value 106A. The block 102A stores a hash value 106D computed via the new hash function from data of a block to which the block 102A links. The block 102B can store a hash value 106B computed from data of the block 102б using the new hash function, and the block 102C is linked to the block 102B by storing the hash value 106B. The block 102C can store a hash value 106C computed from data of the block 102D using the new hash function.

That the hash value 106 of a block 102 is computed from the data of the block 102 can mean that the hash value 106 is computed using the new hash function from the block header of the block 102 after the block header has been updated as compared to when the hash value 104 of the block 102 was computed from the block header using the original hash function. The block header may be updated from when the hash value 104 was computed and when the hash value 106 is computed in the following ways. The version information may be updated to indicate a version number of the blockchain 100 that is different (e.g., higher) than before, connoting the usage of the new hash function, in addition to the prior version number of the blockchain 100 connoting the usage of the original hash function. The hash value of the linked-to block 102 within the block header may be updated to indicate the hash value 106 of the linked-to block 102, in addition to the hash value 104 of the linked-to block 102. The hash tree root may be updated to be a hash value of the root node of the hash tree as computed using the new hash function, in addition to the hash value of the root node as computed using the original hash function. The timestamp, however, may remain the same, since the time at which the block 102 was originally created has not changed. The difficulty target and the nonce can also remain the same.

Once the hash values 106 of the blocks 102 have been computed and stored, the existing blocks 102 of the blockchain 100 are said to have been renewed, or supplemented, via the new hash function. At this time, a hard fork of the blockchain 100 is created. A hard fork is a change in the blockchain protocol that makes previously valid blocks invalid; a hard fork is a permanent divergence in the blockchain, past which non-upgraded blockchain participants cannot validate newly created blocks. In the context of FIG. 1, the hard fork corresponds to when just the new hash function is to be used in computing hash values of newly created blocks. For blockchain participants to validate such newly created blocks, they therefore have to have been upgraded to utilize the new hash function. The blockchain participants can still validate the blocks 102 created prior to the hard fork, because the blocks 102 store the hash values 104 of the blocks 102 computed using the original hash function.

In the example of FIG. 1, two new blocks 110A and 110б, collectively referred to as the blocks 110, which were created after the hard fork are depicted. The singular phrase "block 110" refers to either block 110. The first post-hard fork block 110A stores the hash value 106C of the linked-to block 102C that was computed using the new hash function, and does not store the hash value 104C of the block 102C that was computed using the original hash function. The block 110A can also store a hash value 106E computed using the new hash function, from data of the block 110A such as the block header of the block 110A as has been described. The second post-hard fork block 110б is linked to the block 110A by storing the hash value 106E. The block 110б can store a hash value 106F computed from data of the block 110б, such as the block header of the block 110б, using the new hash function. When another, third post-hard for block is created, it will link to the block 110б by storing the hash value 106F.

FIG. 1 thus illustrates that existing blocks 102 of the blockchain 100 can be renewed with a new hash function by computing and storing new hash values 106. The new hash values 106 are computed prior to any compromise of the original hash function by which the hash values 104 were computed. Therefore, it is known that the data of the blocks 102 remain valid and has not been altered. Subsequent to computing and storing the new hash values 106, any compromise of the original hash function does not affect the integrity of the blockchain 100, because the new hash values 106 can be used to validate the blocks 102. Once the existing blocks 102 of the block chain 100 have been renewed, a hard fork of the block chain 100 means that subsequently created blocks 110 can just have hash values 106 computed using the new hash function; in this respect, it is noted that neither of the blocks 110 has a hash value 104 computed from the data thereof using the original hash function.

Figure 2:
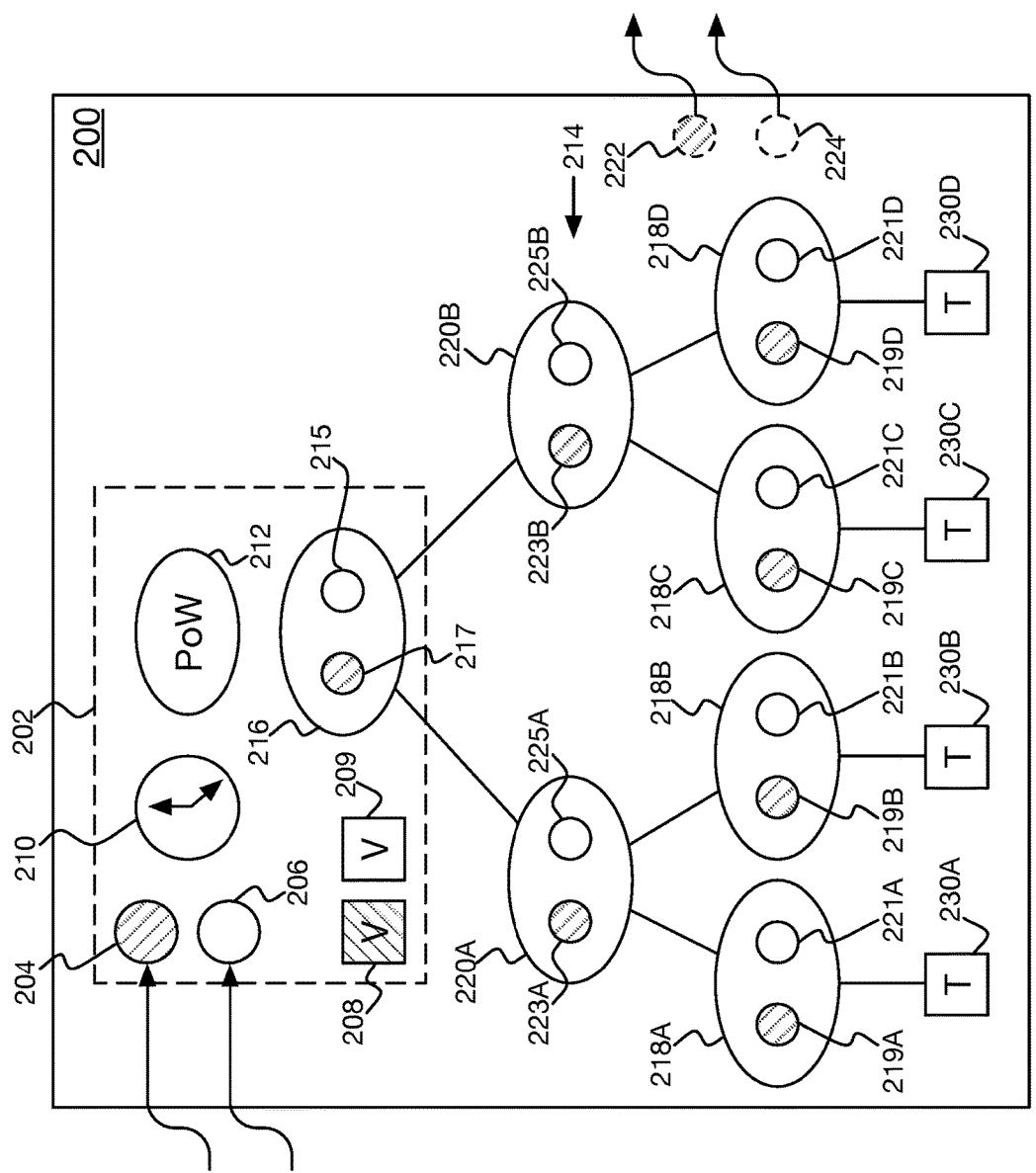
FIG. 2 is a diagram of an example block of a blockchain.

FIG. 2 shows an example blockchain block 200. The block 200 shows in more detail one of the blocks 102 and 110 of the blockchain 100 of FIG. 1. The block 200 includes a block header 202. The header 202 includes a hash value 204 of a prior block to which the block 200 is linked, and which is computed via the new hash function. If the block 200 was created prior to the hard fork of its blockchain, then the block 200 also includes a hash value 206 of the prior block to which the block 200 is linked, and which was computed via the original hash function. The block header 202 includes version information 208 indicating the version of the blockchain corresponding to usage of the new hash function post-hard fork. If the block 200 was created prior to the hard fork, then the block 200 also includes version information 209 indicating the version of the blockchain corresponding to usage of the original hash function pre-hard fork. The block header 202 includes a timestamp 210 and proof-of-work information 212, which can include the difficulty target and the nonce associated with a proof-of-work algorithm, as has been described.

The block header 202 includes a hash value 217 of a root node 216 of a hash tree 214. The hash tree 214 may be a Merkle tree, for instance. The hash value 217 is computed using the new hash function. If the block 200 was created prior to the hard fork of its blockchain, then the block header 202 also includes a hash value 215 of the root node 216 computed using the original hash function. The hash tree 214 encodes the data, which are also referred to as transactions, of the block 200. The transactions of the block 200 may be stored within the block 200 as well.

In the example of FIG. 2, four transactions 230A, 230B, 230C, and 230D are stored, respectively corresponding to the lowest level nodes 218A, 218B, 218C, and 218D of the hash tree 214. The node 218A includes a hash value 219A computed from at least the transaction 230A to which the node 218A corresponds using the new hash function. The node 218B includes a hash value 219A computed from at least the transaction 230B to which the node 218B corresponds using the new hash function. The node 218C includes a hash value 219B computed from at least the transaction 230C to which the node 218C corresponds using the new hash function. The node 218D includes a hash value 219C computed from at least the transaction 230D to which the node 218C corresponds using the new hash function. If the block 200 was created prior to the hard fork of its blockchain, then the nodes 218A, 218B, 218C, and 218D also include hash values 221A, 221B, 221C, and 221D, respectively, computed from the transactions 230A, 230B, 230C, and 230D to which the nodes 218A, 218B, 218C, and 218D respectively correspond using the original hash function. If the block 200 was created prior to the hard fork, then each of the hash values 219A, 219B, 219C and 219D of the nodes 218A, 218B, 218C, and 218D may be computed using the new hash function from both the respective one of the hash values 221A, 221B, 221C, and 221D that was computed using the original hash function and the respective one of the transactions 230A, 230B, 230C, and 230D.

The nodes 220A and 220B of the hash tree 214 have hash values 223A and 223B, computed from at least the hash values 219A, 219B, 219C, and 219D of the nodes 218A, 218B, 218C, and 218D using the new hash function. Specifically, the hash value 223A of the node 220A is computed from at least the hash values 219A and 219B of the nodes 218A and 218B using the new hash function, and the hash value 223B of the node 220A is computed from at least the hash values 219C and 219D of the nodes 218C and 218D using the new hash function. If the block 200 was created prior to the hard fork of its blockchain, then the nodes 220A and 220B also includes hash values 225A and 225B, respectively. The hash value 225A is computed from the hash values 221A and 221B of the nodes 218A and 218B using the original hash function, and the hash value 225B is computed from the hash values 221C and 221D of the nodes 218C and 219D using the original hash function. If the block 200 was created prior to the hard fork, then each of the hash values 223A and 223B of the nodes 220A and 220B may be computed using the new hash function from the respective one of the hash values 225A and 225B that was computed using the original hash function or from the hash values 219 of its children nodes 218.

The hash value 217 of the root node 216 of the hash tree 214 is computed from at least the hash values 223A and 223B of the nodes 220A and 220B using the new hash function. If the block 200 was created prior to the hard fork of its blockchain, then the root node 216 includes the hash value 215 computed from the hash values 225A and 225B of the nodes 220A and 220B using the original hash function. If the block 200 was created prior to the hard fork, then the hash value 217 may be computed using the new hash function from the hash values 223A and 223B, or from the hash value 215 that was computed using the original hash function. In this way, just the hash value(s) of the root node 216 of the hash tree 214 are included in the block header 202 of the block 200, while ensuring that the data, or transactions, of the block 200 are represented within the block header 202. This is because within the hash tree 214 the hash value of each node having children nodes is computed using a hash function of at least the hash values of the children nodes.

A hash value 222 of the block 200 is computed from the block header 202, and thus more generally from the data of the block 200, using the new hash function. The block 200 may store the hash value 222. If the block 200 was created prior to the hard for of its blockchain, a hash value 224 of the block 200 can be computed from the block header 222, and thus more generally from the data of the block 200, using the original hash value. The block 200 may store the hash value 224. The hash value 222 is computed from the block header 202 in that the hash values 204, 206, 215, and 217 along with the version information 208 and 209, the timestamp 210, and the proof-of-work information 212, along with the hash value 224, are input to the new hash function. The hash value 224 is computed from the block header 202 in that the hash values 206 and 215 along with the version information 208, the timestamp 210, and the proof-of-work information 212 are input to the original hash function. (That is, the hash value 224 is an input to the new hash function to generate the hash value 222.) The hash values 204 and 217 are not input to the original hash function, and indeed have not yet been computed at the time the hash value 224 is computed. Similarly, the version information 208 is not input to the original hash function, and indeed may not yet exist at the time the hash value 224 is computed.

The timestamp 210 can remain the same when each of the hash values 222 and 224 is created, which is the time at which the block 200 is created. If the block 200 precedes the hard fork of the blockchain, then the timestamp 210 denotes the time at which the hash value 224 is computed. If the block 200 does not precede the hard fork, then the timestamp 210 denotes the time at which the hash value 222 is computed, and the hash value 224 is not computed. The proof-of-work information 212 can remain the same when each of the hash values 222 and 224 is computed as well. The hash values 222 and 224 are not part of the block header 202 of the block 200.

Figure 3:
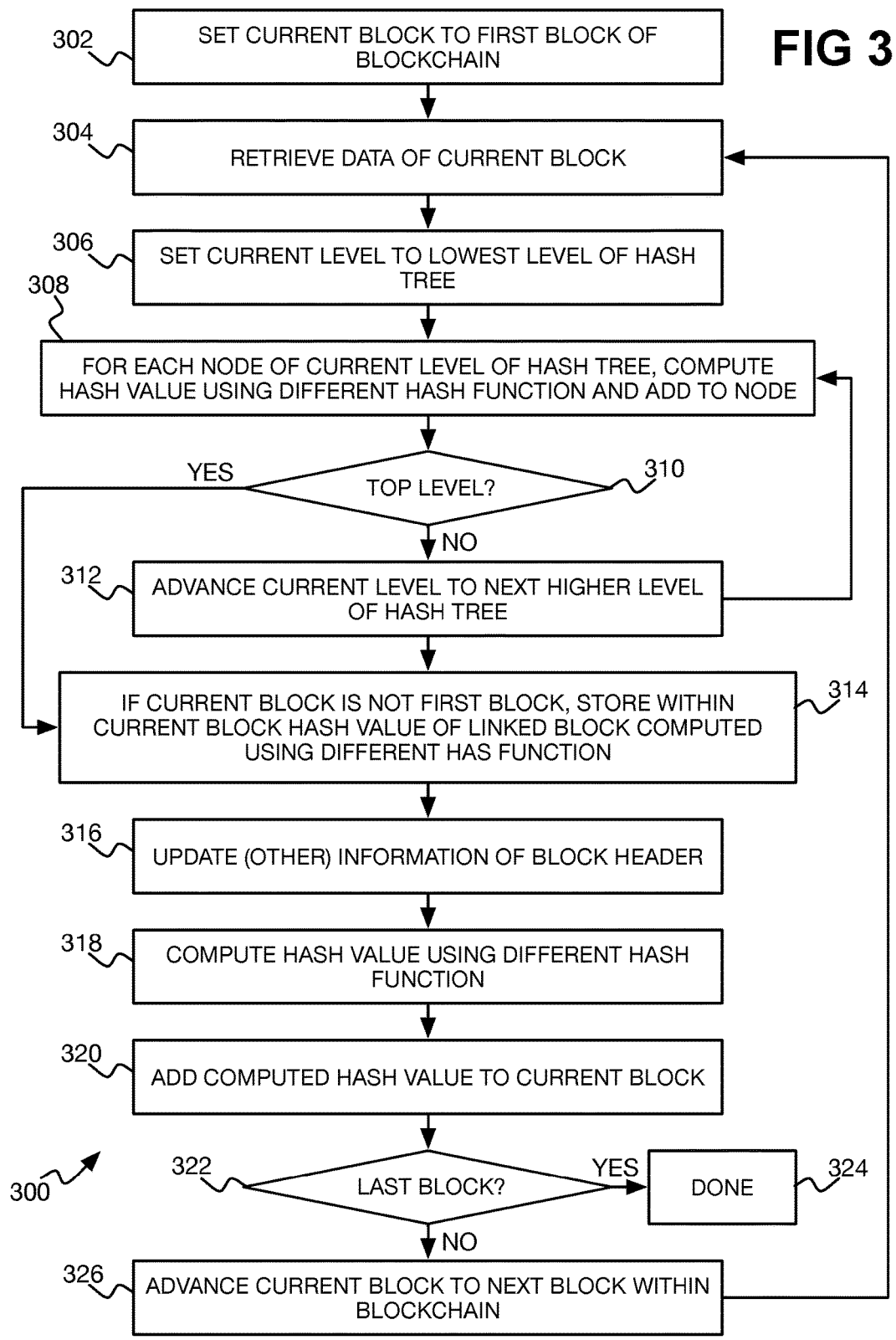
FIG. 3 is a flowchart of an example method for renewing a blockchain having existing blocks, with a different hash function.

FIG. 3 shows an example method 300 for renewing or supplementing, via a different hash function, a blockchain having existing blocks with hash values already computed using a given hash function. The method 300 can be implemented at least in part by computer-executable code stored on a non-transitory computer-readable data storage medium and executed by a processor of a computing device. The method 300 can be used to, for instance, to supplement the blocks 102 of the blockchain 100 of FIG. 1 to add the hash values 106. The method 300 can thus be used to supplement the block 200 of FIG. 2 to add the hash values 204, 219A, 219B, 219C, 219D, 223A, 223B, and 217.

The method 300 sets a current block to the first block of the blockchain (302), which can be referred to as the genesis block of the blockchain. The method 300 retrieves the data of the current block (304), including the header of the current block, the hash tree of the current block, and the transactions on which basis the hash values of the hash tree nodes have been computed. The method 300 sets the current level of the hash tree to the lowest level (306). For each node of the current level of the hash tree, a new hash value is computed using the different hash function and added to the node (308). In the case where the current level is the highest, or top, level, this means that the block header of the current block is updated with a hash value corresponding to the root node of the hash tree and computed using the different hash function. If the current level is not the highest, or top, level of the hash tree (310), then the current level is advanced to the next higher level of the hash tree (312), and the method 300 repeated at part 308.

Once the hash value of each node of each level of the hash tree has been computed using the different hash function (310), if the current block is not the first block of the hash tree, then the hash value of the prior block to which the current block links and that has already been computed using the different hash function is stored within the current block (314). The hash value of the prior block computed using the different hash function also updates the block header of the current block. The block header of the current block may be updated with other information as well (316), such as new version information, as has been described.

A hash value for the block is then computed using the different hash function (318), from the data of the block, such as the block header of the block as has been updated. This computed hash value can be added to the current block (320); it is noted that the hash value previously computed according to the original hash function may not be removed or replaced in part 320. If the current block is the last (i.e., most recent) block within the blockchain (322), then the blockchain renewal process of the method 300 is finished (324). Otherwise, the current block is advanced to the next block within the blockchain (326), and the method 300 is repeated at part 304.

Figure 4:
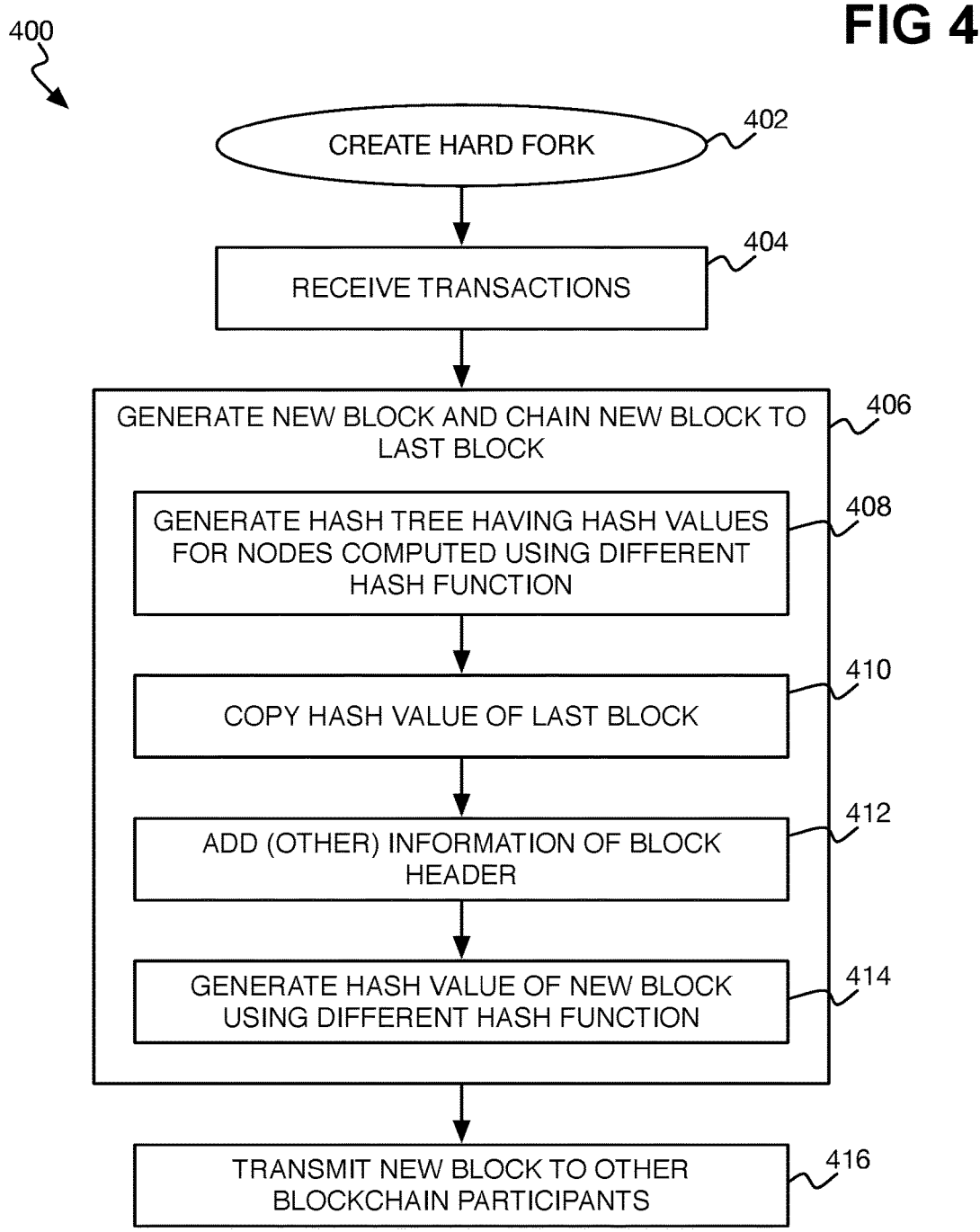
FIG. 4 is a flowchart of an example method for adding a new block to a block chain after a hard fork has been created in the blockchain.

FIG. 4 shows an example method 400 for adding a new block to a blockchain after the blockchain has been renewed with a different hash function, such as in accordance with the method 300 of FIG. 3. The method 400 can be implemented at least in part by computer-executable code stored on a non-transitory computer-readable data storage medium and executed by a processor of a computing device. The method 400 can be used, for instance, to add the blocks 110 to the blockchain 100 of FIG. 1. The method 400 can thus be used to create the block 200 of FIG. 2. The method 400 begins with the creation of a hard fork within the blockchain (402). Thereafter, one or more transactions (404), or data, are received to encode within a new block to be added to the blockchain. This new block is generated or created and chained to the last (i.e., most recent) block of the blockchain (406), using the different hash function and not the original hash function of the blockchain; the original hash function is not used to add new blocks to the blockchain after the hard fork. The received transactions may be stored within the new block.

A hash tree having nodes can be created if there is more than one received transaction (408). The lowest level nodes have hash values computed from respective ones of the received transactions using the different hash function, where each such node can correspond to a different transaction. The number of nodes at the lowest level of the hash tree can correspond to the number of transactions. Nodes within the other levels of the hash tree also have hash values, computed from the hash values of their children nodes using the different hash function. The hash tree can be a binary hash tree, such as that described in relation to FIG. 2, or another type of hash tree.

The computed hash value of the root node can be part of the header block of the new block. The hash value of the last block that was computed using the different hash function is copied (410), and can also be part of the header block of the new block. It is noted that for the first new block generated after the hard fork, the last block is part of the blockchain pre-hard fork, and thus has both a hash value computed using the original hash function and a hash value computed using the different hash function. In this case, just the hash value computed using the different hash function is added to the newly generated block, and not the hash value computed using the original hash function. For every other block generated after the hard fork, the last block will just have a hash value computed using the different hash function.

Other information can be added to the block header of the new block as well (412). This information can include version information regarding the blockchain, signifying that the block being added is post-hard fork, as well as a timestamp indicating the time of creation of the block, and proof-of-work information regarding the block. Once the block header of the new block is completed, a hash value of the new block can then be generated from the block header using the different hash function (414).

Insofar as the method 400 is performed by a processor executing computer-executable code, the processor is part of a computing device, or system, which is one participant in the blockchain. A blockchain is a distributed database, and thus upon creation of the new block and chaining the new block to the last block, the new block is transmitted to other participants in the blockchain (416), which are also maintaining the blockchain. The other participants may be other computing devices or systems, for instance. The information transmitted to the other participants in the blockchain can include at least the hash value of the new block that has been computed using the different hash function.

Figure 5:
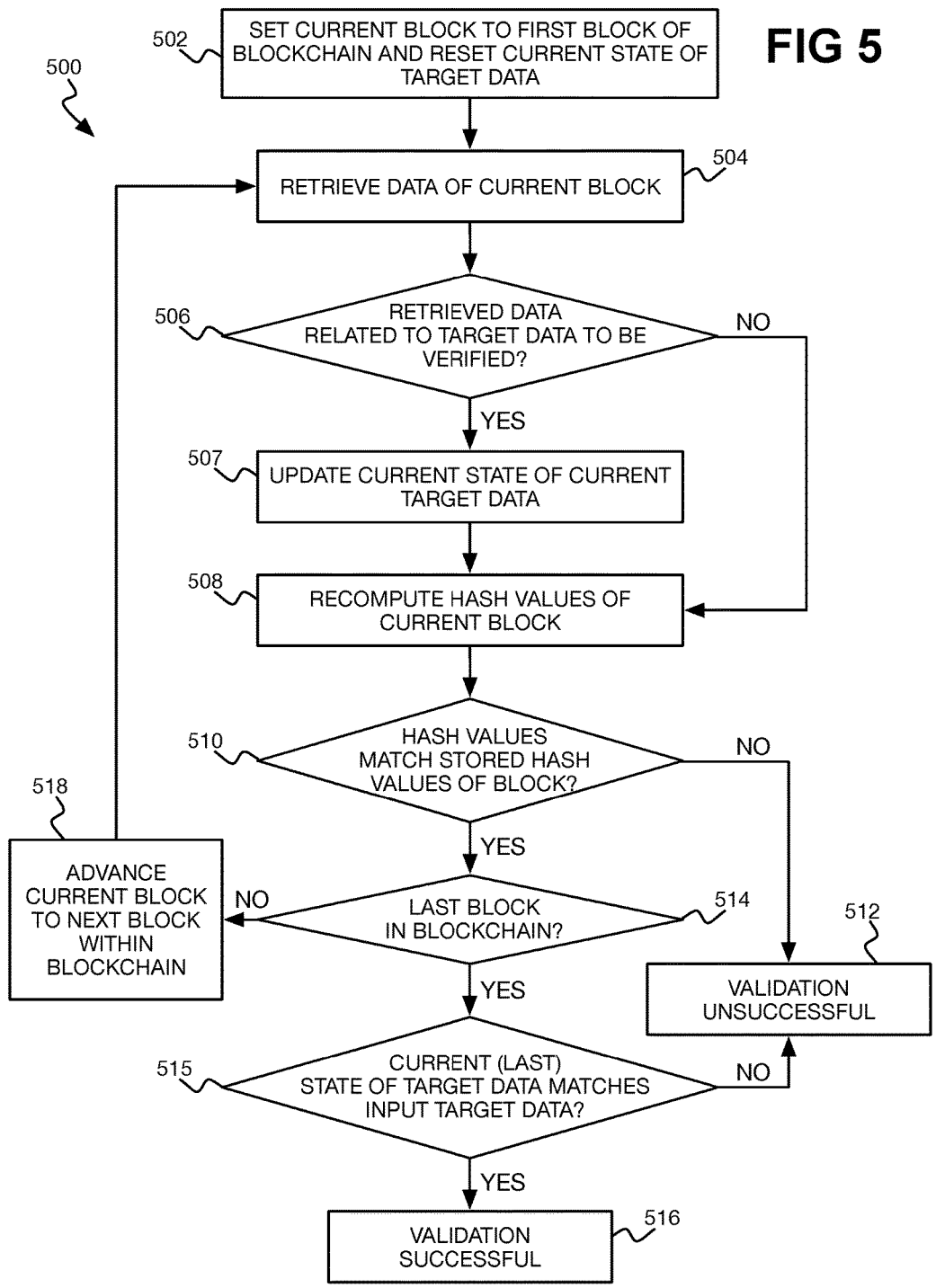
FIG. 5 is a flowchart of an example method for validating a blockchain.

FIG. 5 shows an example method 500 for validating a blockchain that has been renewed with a different hash function, such as in accordance with the method 300 of FIG. 3, and which may have had additional blocks added after a hard fork, such as in accordance with the method 400 of FIG. 4. The method 400 can be implemented at least in part by computer-executable code stored on a non-transitory computer-readable data storage medium and executed by a processor of a computing device.

The method 500 is described in relation to blockchain validation in which target data is desired to be verified. For example, for a cryptocurrency blockchain, like Bitcoin, the target data to be verified may be a current cryptocurrency account balance associated with a public key as an account of the cryptocurrency. As another example, for a provenance blockchain, like a blockchain that records title of real or other tangible or intangible property (i.e., a public key associated with the property), the target data to be verified may be a current titleholder (i.e., a public key associated with the current titleholder) of the property.

The method 500 sets a current block to the first block of the blockchain and resets a current state of the target data (502). For example, for a cryptocurrency blockchain, a running account balance associated with a public key may be reset to zero. For a provenance blockchain, the public key associated with a current titleholder of a property may be reset to null.

The data of the current block is retrieved (504). The data can include the transactions on which basis a hash value has been computed for the block. For a pre-hard fork block, the data includes at least one hash value computed using an original hash function, and at least one hash value computed using an updated hash function. In relation to FIG. 2, for instance, the former hash values are indicated by empty circles, and the latter hash values are indicated by shaded circles. For a post-hard fork block, the data includes at least one hash value computed using the updated hash function.

If the retrieved data is related to the target data to be verified (506), then the current state of the target data is updated (507). The retrieved data may not be related to the target data to be verified if the current block does not store any transactions related to the target data. For example, for a cryptocurrency blockchain, transactions may be related to the target data if they include the public key (i.e., accountholder) sending an amount of cryptocurrency or receiving an amount of cryptocurrency, in which case the running account balance is correspondingly debited or credited. For a provenance blockchain, transactions may be related to the target data if they record transfer of title of a public key (i.e., property), in which case the public key associated with the party receiving transfer is updated, as the current the titleholder of the property.

The retrieved hash values are recomputed for the current block (508). The hash values are specifically recomputed using at least the updated hash function. Recomputing the hash values using the updated hash function for a pre-hard fork block also involves the original hash function. This is because the data of the block on which basis the hash values are recomputing using the updated hash function includes the hash values of the block that were previously computed using the original hash function, as described above.

If the recomputed hash values match the stored hash values within the block (510), then this means that the current block is valid. If the current block is the last block in the blockchain (514), and if the (input) target data to be verified matches the current state of the target data, which is the last state of the target data per the most recent updated in part 507 (515), then validation is successful (516). For instance, for a cryptocurrency blockchain, if the running account balance of cryptocurrency associated with a public key is not equal to the target data to be verified—or is otherwise insufficient—then validation fails. The target data to be verified in this case may be that the public key has exactly a certain amount of cryptocurrency (such that equality to the last current state is tested), or at least a certain amount of cryptocurrency (such that sufficient of the last current state is tested). For a provenance blockchain, if the public key associated with the party having current title to a property is not the target data to be verified (i.e., a public key associated with a particular party), then validation fails. If the current block is not the last block in the block chain (514), then the current block is advanced to the next block within the blockchain (518), and the method 500 is repeated at part 504.

Validation can thus fail in different ways. First, if the computed hash values do not match the stored hash values for a current block, then the method 500 proceeds to part 512 from part 510. Validation fails in this case because the integrity of the data contained in at least one block has been compromised. Second, if the last current state of the target data is not said to match the input target data, then the method 500 proceeds to part 512 from part 515. Validation fails in this case not because the integrity of the blockchain itself has been compromised, but rather because the input target data in question has not been verified. Furthermore, validation may fail if digital signatures associated with any transaction cannot be or are not properly validated.

In the method 500, then, as data is retrieved that is related to the target data to be verified, an effective running total or other current state may be tabulated to compare against the target data. For example, the account balance can be credited or debited as transactions related to a public key are retrieved. Once the last block in the blockchain has been reached, the resulting balance can be compared against the target data to verify that the target data (e.g., an alleged current balance) is correct. As another example, the current titleholder of property may be updated as related transactions are retrieved. Once the last block in the blockchain has been reached, the current titleholder can be compared against the target data to verify that the target data (e.g., an alleged current titleholder) is correct.

Figure 6:
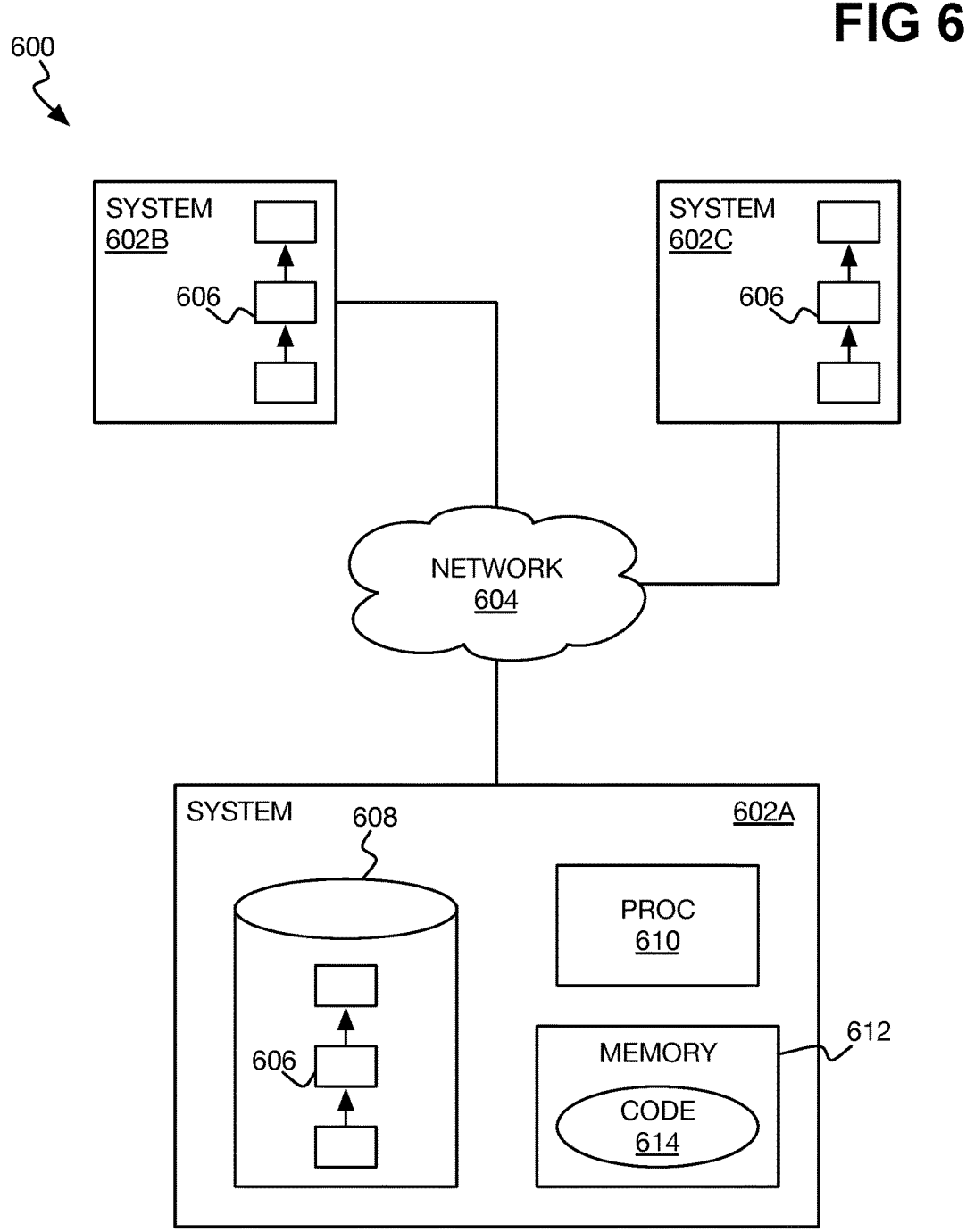
FIG. 6 is a diagram of an example blockchain architectural topology.

FIG. 6 shows an example blockchain architectural topology 600. FIG. 6 shows three systems 602A, 602B, and 602C, collectively referred to as the systems 602, interconnected to one another over a network 604. The systems 602 each store and thus maintain a blockchain 606, such as the blockchain 100 of FIG. 1. The systems 602 are considered participants of the blockchain 606. There may be more than three systems 602, and as few as one system 602. The systems 602 can each be a computing device, or multiple computing devices.

The blockchain 606 is a distributed database, and can be a distributed ledger blockchain. The blockchain 606 can be a public, permissionless blockchain, in which each system 602 can add blocks to the blockchain 606 without first requesting permission from any other participant. Rather, when a system 602 wishes to add a block to the blockchain 606, it subsequently transmits the added block to one or more other participants, and the nature of blockchain technology itself ensures that race and other conditions are resolved. The blockchain 606 can be the Bitcoin distributed ledger blockchain in one implementation.

Of the systems 602, the system 602A is depicted in example detail in FIG. 6. The system 602A includes a hardware storage device 608 that stores the blockchain 606. The system 602A also includes a processor 610 and memory 612 or other type of non-transitory computer-readable data storage medium. The memory 612 stores computer-executable code 614. The processor 610 executes the computer-executable code 614 to perform the methods 300, 400, and/or 500 that have been described.

The techniques that have been described herein thus improve blockchain technology. A blockchain may be initially developed with a given, or original, hash function, such that blocks are added to the blockchain that have hash values computed using the given hash function. The techniques disclosed herein permit such a blockchain having existing blocks to be renewed with a different hash function, which may be cryptographically more secure that the original hash function. Once the renewal process has been completed and a hard fork created in the blockchain, any subsequently determined vulnerability of the previous (i.e., original) hash function does not result in compromise of the data security of the blockchain.

We claim:

1. A non-transitory computer-readable storage medium storing computer-executable code that upon execution causes a system to:
   for each block of a plurality of blocks of a blockchain, retrieve data of the block on which basis a first hash value of the block was computed, the first hash value stored in the block and computed using a first hash function;
   compute, from the retrieved data, a second hash value of the block using a second hash function different from the first hash function; and
   add the second hash value to the block within the blockchain.

2. The non-transitory computer readable storage medium of claim 1, wherein the computer-executable code upon execution causes the system to further, for each respective block of the blockchain except for a first block of the blockchain:
   store, within the respective block, a third hash value of a previous block to which the respective block is directly linked within the blockchain, the third hash value computed using the first hash function; and
   store, within the respective block, a fourth hash value of the previous block, the fourth hash value computed using the second hash function.

3. The non-transitory computer readable storage medium of claim 1, wherein upon computation of the second hash value of each block of the blockchain and addition of the second hash value to the block within the blockchain, any subsequently determined vulnerability of the first hash function does not compromise data security of the blockchain.

4. The non-transitory computer readable storage medium of claim 1, wherein the computer-executable code upon execution causes the system to:
   create a hard fork within the blockchain, wherein new blocks added to the blockchain after creation of the hard fork are generated using the second hash function.

5. The non-transitory computer readable storage medium of claim 4, wherein the computer-executable code upon execution causes the system to further, after the hard fork has been created:
   add a new block to the blockchain, including computing a hash value of the new block using the second hash function and not the first hash function.

6. The non-transitory computer-readable storage medium of claim 4, wherein the first hash function is not used within the blockchain to compute hash values that are stored within new blocks within the blockchain, after the hard fork has been created.

7. The non-transitory computer readable storage medium of claim 1, wherein the retrieved data of the block includes a plurality of transactions of the block organized as a plurality of hierarchical nodes within a hash tree,
   and wherein the computer-executable code upon execution causes the system to:
   compute the second hash value of the block by, for each transaction, computing a new hash value for the node to which the transaction corresponds, using the second hash function;
   add the second hash value to the block by, for each transaction, adding the new hash value to the node to which the transaction corresponds within the hash tree.

8. The non-transitory computer readable storage medium of claim 1, wherein the first hash value of each block that was computed using the first hash function remains within the block in the blockchain and is not removed or replaced by the second hash value added to the block.

9. The non-transitory computer readable storage medium of claim 1, wherein the blockchain comprises a distributed ledger blockchain.

10. The non-transitory computer readable storage medium of claim 9, wherein the distributed ledger blockchain comprises a public, permissionless distributed ledger blockchain.

11. The non-transitory computer readable storage medium of claim 10, wherein the public, permissionless distributed ledger blockchain comprises a Bitcoin public, permissionless distributed ledger blockchain.

12. A method comprising:
   receiving, by a processor of a computing device participating in a blockchain database, one or more transactions;
   generating, by the processor, a block of the transactions, including computing a hash value for the block using an updated hash function; and
   chaining, by the processor, the block to a last block of the blockchain database including a plurality of blocks, wherein each block of the plurality of blocks includes a second hash value computed using the updated hash function, and a first hash value computed using an original hash function.

13. The method of claim 12, wherein generating the block comprises:
   generating a hash tree including a plurality of nodes having hash values computed using the updated hash function, based on the transactions.

14. The method of claim 12, further comprising, prior to generating the block:
   creating, by the processor, a hard fork within the blockchain database, corresponding to switchover to exclusive usage of the updated hash function for new blocks added to the blockchain database.

15. The method of claim 12, further comprising:
   transmitting, by the processor, the generated block to a plurality of peer computing devices participating in the blockchain database.

16. The method of claim 12, wherein the blockchain database comprises a public, permissionless distributed ledger blockchain database.

17. The method of claim 16, wherein the public distributed ledger blockchain comprises a Bitcoin public, permissionless distributed ledger blockchain database.

18. A system comprising:
   a processor; and
   a non-transitory storage medium storing instructions executable on the processor to:
   store, for a distributed blockchain, a plurality of blocks chained to one another, including temporally earlier blocks that each store both a hash value computed using a prior hash function and a new hash value using an updated hash function, and temporally later blocks that each store a new hash value computed using the updated hash function and do not store a hash value computed using the prior hash function; and validate the distributed blockchain.

19. The system of claim 18, wherein the instructions are executable on the processor to assist in maintaining the distributed blockchain, including adding new blocks to the distributed blockchain including just new hash values computed using the updated hash function.

20. The system of claim 18, wherein the distributed blockchain comprises a Bitcoin distributed blockchain.

* * * * *